(12) United States Patent
Chen et al.

(10) Patent No.: US 12,254,865 B2
(45) Date of Patent: *Mar. 18, 2025

(54) MULTI-DIALECT AND MULTILINGUAL SPEECH RECOGNITION

(71) Applicant: Google LLC, Mountain View, CA (US)

(72) Inventors: Zhifeng Chen, Sunnyvale, CA (US); Bo Li, Santa Clara, CA (US); Eugene Weinstein, New York, NY (US); Yonghui Wu, Fremont, CA (US); Pedro J. Moreno Mengibar, Jersey City, NJ (US); Ron J. Weiss, New York, NY (US); Khe Chai Sim, Dublin, CA (US); Tara N. Sainath, Jersey City, NJ (US); Patrick An Phu Nguyen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,246

(22) Filed: Jan. 20, 2024

(65) Prior Publication Data

US 2024/0161732 A1 May 16, 2024

Related U.S. Application Data

(63) Continuation of application No. 17/572,238, filed on Jan. 10, 2022, now Pat. No. 11,900,915, which is a
(Continued)

(51) Int. Cl.
*G10L 15/00* (2013.01)
*G10L 15/06* (2013.01)
(Continued)

(52) U.S. Cl.
CPC ............ *G10L 15/005* (2013.01); *G10L 15/07* (2013.01); *G10L 15/16* (2013.01); *G10L 2015/0631* (2013.01)

(58) Field of Classification Search
CPC ........ G10L 15/005; G10L 15/07; G10L 15/16
See application file for complete search history.

(56) References Cited

U.S. PATENT DOCUMENTS

| 2017/0148433 A1 | 5/2017 | Catanzaro et al. |
| 2019/0189111 A1* | 6/2019 | Watanabe ............... G10L 15/16 |

OTHER PUBLICATIONS

Zhou, Multilingual End-to-End Speech Recognition with a Single Transformer on Low-Resource Languages, arXiv, Jun. 14, 2018, whole document (Year: 2018).*

(Continued)

*Primary Examiner* — Sonia L Gay
(74) *Attorney, Agent, or Firm* — Honigman LLP; Brett A. Krueger; Grant Griffith

(57) ABSTRACT

Methods, systems, and apparatus, including computer programs encoded on a computer-readable media, for speech recognition using multi-dialect and multilingual models. In some implementations, audio data indicating audio characteristics of an utterance is received. Input features determined based on the audio data are provided to a speech recognition model that has been trained to output score indicating the likelihood of linguistic units for each of multiple different language or dialects. The speech recognition model can be one that has been trained using cluster adaptive training. Output that the speech recognition model generated in response to receiving the input features determined based on the audio data is received. A transcription of the utterance generated based on the output of the speech recognition model is provided.

18 Claims, 8 Drawing Sheets

Related U.S. Application Data continuation of application No. 16/684,483, filed on Nov. 14, 2019, now Pat. No. 11,238,845.

(60) Provisional application No. 62/770,534, filed on Nov. 21, 2018.

(51) Int. Cl.
*G10L 15/07* (2013.01)
*G10L 15/16* (2006.01)

(56) References Cited

OTHER PUBLICATIONS

Waibel,, Using Language Adaptive Deep Neural Networks for Improved Multilingual Speech Recognition, "Using language adaptive deep neural networks for improved multilingual speech recognition," IWSL T, 2015. (Year: 2015).
Mueller, Phonemic and Graphemic Multilingual CTC BAsed Speech Recognition, arViv, 2017 (Year: 2017).
Waibel, Multilingual Adaptation of RNN Based ASR Systems, IEE Intercational Conferemce on Acoustics, Speech and Signal Processing, Apr. 15-20, 2018 (Year: 2018).
USPTO. Office Action relating to U.S. Appl. No. 17/572,238, dated Jun. 16, 2023.

\* cited by examiner

MULTI-DIALECT AND MULTILINGUAL SPEECH RECOGNITION

CROSS-REFERENCE TO RELATED APPLICATION

This U.S. patent application is a continuation of, and claims priority under 35 U.S.C. § 120 from, U.S. patent application Ser. No. 17/572,238, filed on Jan. 10, 2022, which is a continuation of U.S. patent application Ser. No. 16/684,483, filed on Nov. 14, 2019, which claims priority under 35 U.S.C. § 119(e) to U.S. Provisional Application 62/770,534, filed on Nov. 21, 2018. The disclosures these prior applications are considered part of the disclosure of this application and are hereby incorporated by reference in their entireties.

BACKGROUND

The present specification relates to speech recognition. Speech recognition has made remarkable progress in the past few years. Nevertheless, building a speech recognizer that can accurately recognize speech in multiple different languages or dialects is still a challenge.

SUMMARY

Sequence-to-sequence models can provide a simple and elegant solution for building speech recognition systems by folding separate components of a typical speech recognition system, namely acoustic (AM), pronunciation (PM) and language (LM) models into a single neural network. In some implementations, a single sequence-to-sequence model, such as a model of the listen, attend and spell (LAS) type, can be trained to serve multiple different English dialects, which simplifies the process of training multi-dialect systems without the need for separate AM, PM and LMs for each dialect. In general, simply pooling the data from all dialects into one LAS model falls behind the performance of a model fine-tuned on each dialect. However, incorporating dialect-specific information into the model can improve performance, for example, through techniques of modifying the training targets by inserting the dialect symbol at the end of the original grapheme sequence and also feeding a 1-hot representation of the dialect information into all layers of the model. In fact, a multi-dialect model structured and trained in this way can provide greater accuracy than specialized, single-dialog models. Experimental results for seven English dialects show that a single, multi-dialect LAS model is effective in modeling dialect variations, outperforming single-dialect LAS models (each trained individually on each of the seven dialects) with 3.1~16.5% relative reductions in word error rate (WER).

Dialects are variations of the same language, specific to geographical regions or social groups. Although different dialects share many similarities, there are usually large differences at several linguistic levels; amongst others: phonological, grammatical, orthographic (e.g., "color" vs. "colour") and very often different vocabularies. As a result, automatic speech recognition (ASR) systems trained or tuned for one specific dialect of a language perform poorly when tested on another dialect of the same language. In addition, systems simultaneously trained on many dialects fail to generalize well for each individual dialect. Inevitably, multi-dialect languages pose a challenge to ASR systems. If enough data exists for each dialect, a common practice is to treat each dialect independently. Alternatively, in cases where dialects are resource-scarce, these models are boosted with data from other dialects. In the past, there have been many attempts to build multi-dialect/language systems. The usual approach has been to define a common set of universal phone models with appropriate parameter sharing and train it on data from many languages. The data can be adapted from the language of interest developed, similar to neural network models with language independent feature extraction and language dependent phonetic classifiers.

One of the challenges of building a universal multi-dialect model for conventional ASR systems is that many of these models still require a separate pronunciation model (PM) and language model (LM) per dialect, which are trained independently from the multi-dialect acoustic model (AM). Therefore, if the AM predicts an incorrect set of sub-word units from the incorrect dialect, errors are propagated to the PM and LM. Sequence-to-sequence models provide a simple and elegant technique for the ASR task by learning and optimizing a single neural network for the AM, PM and LM. This provides a significant advantage for building a single multi-dialect system. Training a multi-dialect sequence-to-sequence model is simple, as the output set of symbols to be predicted can be generated by simply pooling all the grapheme symbols together across the dialects. In addition, the AM, PM and LM variations are jointly modeled across dialects. The simplicity and joint optimization make it effective for training multi-dialect systems.

In some implementations, attention-based sequence-to-sequence models are adopted, namely listen, attend and spell (LAS) for multi-dialect modeling. It has shown good performance compared to other sequence-to-sequence models for single dialect tasks. As discussed below, one example model has the goal of recognizing each of seven English dialects with a single LAS model. One approach is to simply pool all the data from the seven dialects together. For English, the grapheme set is shared across dialects, so nothing needs to be modified for the output. Although this model often gives acceptable performance for each dialect, this model falls behind the models independently fine-tuned on each dialect.

However, by explicitly providing dialect information (e.g., a dialect identifier or other dialect-indicating data) to the LAS model, the gap between the dialect-independent and dialect-dependent models can be bridged. First, the dialect information is used in the output by introducing an artificial token into the grapheme sequence. The LAS model can learn both grapheme prediction and dialect classification. Second, the dialect information is fed as input to the system, for example, as input vectors to the one or more layers of the LAS model. The dialect information can be either used as an extra information vector appended to the inputs of each layer or as weight coefficients for cluster adaptive training (CAT). The experimental results show that using dialect information can elevate the performance of multi-dialect LAS system to outperform dialect-dependent ones. The proposed system has several advantages. One advantage is simplicity, since no changes are required for the model and scaling to more dialects is trivial by simply adding more data. Another advantage is improvement for low-resource dialects: in the multi-dialect system, the majority of the parameters are implicitly shared by all the dialects, which forces the model to generalize across dialects during training. With these techniques, the recognition quality (e.g., accuracy) on the low resource dialect is significantly improved.

This document also discloses techniques for training a single speech recognition model to be able to recognize speech in each of multiple languages. Training a conventional automatic speech recognition (ASR) system to support multiple languages is challenging because the sub-word unit, lexicon, and word inventories are typically language-specific. In contrast, sequence-to-sequence models are well suited for multilingual ASR because they encapsulate an acoustic, pronunciation and language model jointly in a single network. Below, a single sequence-to-sequence ASR model is discussed that is trained on 9 different Indian languages, which have very little overlap in their scripts. Specifically, the model is generated using a union of language-specific grapheme sets, and by training a grapheme-based sequence-to-sequence model jointly on data from all languages. This model, which is not explicitly given any information about language identity, improves recognition performance by 21% relative compared to analogous sequence-to-sequence models trained on each language individually. By modifying the model to accept a language identifier as an additional input feature, the model's performance (e.g., accuracy) improves an additional 7% relative and eliminates confusion between different languages.

In many cases, the resources available to train large vocabulary continuous speech recognizers are severely limited. These challenges result in a high interest in multilingual and cross-lingual models which allow for knowledge transfer across languages, and thus relieve burdensome data requirements. Most of the previous work on multilingual speech recognition has been limited to making the acoustic model (AM) multilingual. These multilingual AMs still require language-specific pronunciation models (PMs) and language models (LMs) which means that often such models must know the speech language identity during inference. Moreover, the AMs, PMs and LMs are usually optimized independently, in which case errors from one component propagate to subsequent components in a way that was not seen during training.

Sequence-to-sequence models fold the AM, PM and LM into a single network, making them attractive to explore for multilingual speech recognition. Building a multilingual sequence-to-sequence model involves taking the union over all the language-specific grapheme sets and training the model jointly on data from all the languages. In addition to their simplicity, the end-to-end nature of such models means that all of the model parameters contribute to handling the variations between different languages.

In some implementations, an attention-based sequence-to-sequence model is based on the Listen, Attend and Spell (LAS) model, the details of which are explained in the next section. The work is similar to that of which similarly proposes an end-to-end trained multilingual recognizer to directly predict grapheme sequences in 10 distantly related languages. The grapheme sequences utilize a hybrid attention/connectionist temporal classification model integrated with an independently trained grapheme LM. A simpler sequence-to-sequence model without an explicit LM, and study a corpus of 9 more closely related Indian languages.

As discussed further below, a LAS model, jointly trained across data from 9 Indian languages without any explicit language specification to the model, consistently outperforms monolingual LAS models trained independently on each language. Even without explicit language specification, the model is rarely confused between languages. Language-dependent variants of the model can also be made. The largest improvement is obtained by conditioning the encoder on the speech language identity. Several experiments on synthesized data provide insights into the behavior of these models. Often, the multilingual model is unable to code-switch between languages, indicating that the language model is dominating the acoustic model. The language-conditioned model is able to transliterate Urdu speech into Hindi text, suggesting that the model has learned an internal representation, which disentangles the underlying acoustic-phonetic content from the language.

In one general aspect, a method of performing speech recognition using an automated speech recognition system comprising one or more computers, includes: receiving, by the one or more computers of the automated speech recognition system, audio data indicating audio characteristics of an utterance; providing, by the one or more computers of the automated speech recognition system, input features determined based on the audio data to a speech recognition model that has been trained to output score indicating the likelihood of linguistic units for each of multiple different language or dialects, the speech recognition model being trained using training examples representing speech in multiple languages or dialects and with data indicating languages or dialects of the training examples; receiving, by the one or more computers of the automated speech recognition system, output that the speech recognition model generated in response to receiving the input features determined based on the audio data; and providing, as an output of the automated speech recognition system, a transcription of the utterance generated based on the output of the speech recognition model.

In some implementations, the speech recognition model comprises an encoder, a decoder, and an attention model that learns alignments between outputs of the encoder and the decoder, and the encoder, the decoder, and the attention model each comprise one or more neural network layers that have parameters learned through training using the using training examples representing speech in multiple languages or dialects.

In some implementations, the linguistic units are graphemes, and the speech recognition model is configured to provide output indicating a probability distribution over a predetermined set of graphemes.

In some implementations, the speech recognition model has been trained using multi-task learning using (i) a first objective function corresponding to grapheme prediction, and (ii) a second objective function corresponding to a language or dialect classification cost, the first objective function and second objective function being weighted such that the speech recognition model is trained to learn hidden representations that are effective for both language and dialect classification and grapheme prediction.

In some implementations, the speech recognition model is trained to output scores indicative of labels representing different languages or dialects, and wherein the speech recognition model is trained to generate output sequences that include one of the labels representing the different languages or dialects.

In some implementations, the labels for the language or dialect is included in the output sequences after linguistic units of the output sequences.

In some implementations, the method includes determining a language or dialect of the utterance; and providing, as input to the speech recognition model, data indicating the language or dialect as input to one or more neural network layers of the speech recognition model. The output of the speech recognition model is generated based on input features determined from the audio data for the utterance and the data indicating the language or dialect of the utterance.

In some implementations, providing data indicating the language or dialect comprises providing a 1-hot vector having a value corresponding to each of a predetermined set of languages or dialects.

In some implementations, the data comprises an embedding corresponding to the language or dialect that has been learned through training.

In some implementations, the data indicating the language or dialect is provided as input to one or more neural network layers of the encoder.

In some implementations, the data indicating the language or dialect is provided as input to one or more neural network layers of the of the decoder In some implementations, the data indicating the language or dialect is provided as input to one or more neural network layers of the encoder and to one or more neural network layers of the decoder.

In some implementations, wherein the data indicating the language or dialect is provided as input to each neural network layer of the encoder and to each neural network layer of the decoder.

In some implementations, at each neural network layer of the encoder and the decoder, a vector indicative of the language or dialect is linearly transformed by the weight matrices of the neural network layer and added to the original hidden activations before a nonlinearity is applied.

In some implementations, the speech recognition model has been trained using cluster adaptive training, with each language or dialect corresponding to a separate cluster, and wherein each language or dialect has a corresponding language or dialect vector provided as input to the speech recognition model to specify the use of the language or dialect.

In some implementations, the language or dialect vectors are one-hot vectors.

In some implementations, the speech recognition model has been trained using cluster adaptive training, with each language or dialect corresponding to a separate cluster, and wherein language or dialect embedding vectors learned through training are used as weights to combine clusters.

In some implementations, the speech recognition model comprises an encoder, a decoder, and an attention model that learns alignments between outputs of the encoder and the decoder. The encoder, the decoder, and the attention model each comprise one or more neural network layers that have parameters learned through training using the using training examples representing speech in multiple languages or dialects. The speech recognition model has been trained using cluster adaptive training, with each language or dialect corresponding to a separate cluster. For each cluster, a single LSTM layer is used with output projection to match the dimension of a particular layer of the speech recognition model. A weighted sum of all the cluster adaptive trained bases using dialect vectors as interpolation weights is added back to the outputs of the particular layer to generate an aggregated output vector. The aggregated output vector is provided as input to last layer of the encoder of the speech recognition model.

In some implementations, the speech recognition model has been trained to output scores indicating likelihoods of graphemes in a set representing the union of language-specific grapheme sets for multiple languages, wherein one or more of the language-specific grapheme sets include one or more graphemes not included in the language-specific grapheme set for another of the multiple languages, and wherein the speech recognition model has been trained based on training examples from each of the multiple languages.

In some implementations, the speech recognition model is arranged such that all of the model parameters contribute to accounting for variations between different languages.

In some implementations, the speech recognition model is trained using multitask training to predict a language identifier and graphemes corresponding to input data, wherein language identification annotations labeling training examples are used during training of the speech recognition model, but language identification data is not provided as an input during inference using the speech recognition model.

In some implementations, during training, output of an encoder of the speech recognition model is averaged across multiple frames to obtain an utterance-level feature vector, which is passed to a softmax layer to predict the likelihood of speech belonging to each of the multiple languages.

In some implementations, the speech recognition model is explicitly conditioned on language identification input and is configured to receive a language identifier as input during inference using the speech recognition model.

In some implementations, the language identifier for each language is a fixed-dimensional language embedding learned through training, and wherein the speech recognition model is configured to receive a language embedding as input to a first layer of an encoder of the speech recognition model, as input to a first layer of a decoder of the speech recognition model, or as input to both a first layer of an encoder of the speech recognition model and a first layer of a decoder of the speech recognition model.

In some implementations, the transcription is determined without using a language model.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
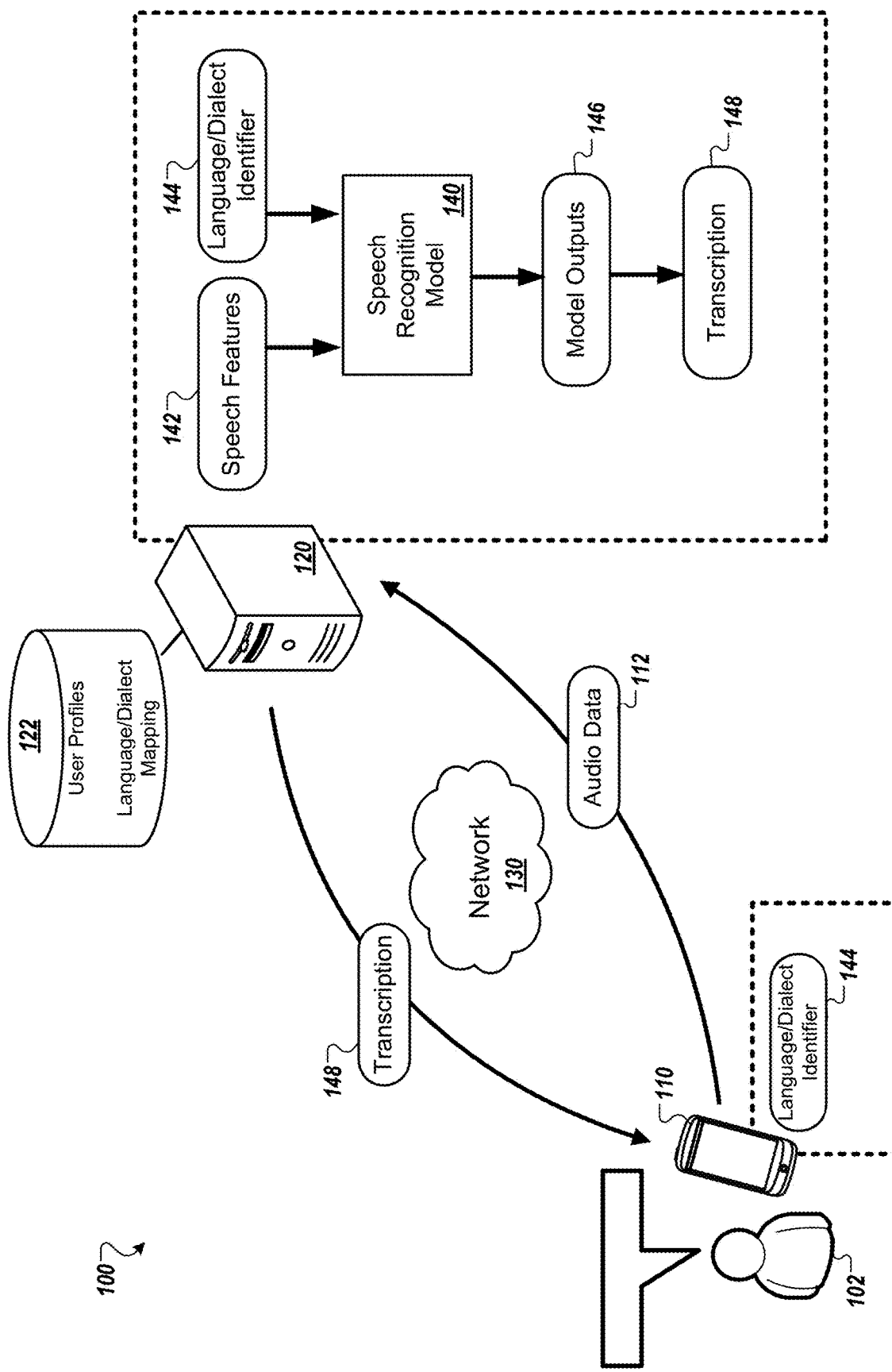
FIG. 1 is a diagram illustrating an example of a system for multi-dialect and multilingual speech recognition.

FIG. 1 is a diagram illustrating an example of a system 100 for multi-dialect and multilingual speech recognition. The system 100 includes a client device 110, a server system 120, and a network 130. The client device 110 communicates audio data 112 representing an utterance of a user 102 to the server system 120. To recognize the speech encoded in the audio data 112, the server system 120 uses a speech recognition model 140 that has been trained to recognize speech of multiple languages and/or dialects. The transcription of the user's utterance can then be provided to the client device 110. In addition, or as an alternative, the transcription can be used in other ways, such as to identify a user request to a digital assistant.

As discussed below, a single speech recognition model 140 that has been trained to recognize speech in multiple languages and/or dialects can provide better recognition accuracy than an individual model for a specific dialect or a collection of separate models each trained for different languages or dialects. In some implementations, as in FIG. 1, most of or all of the parameters of the speech recognition model 140 contribute to recognition of speech for all languages and/or dialects the speech recognition model 140 is trained to recognize. In other words, the speech recognition model 140, as a whole, is jointly trained based on training examples in multiple languages, without separate portions of the speech recognition model 140 designated or trained for different languages or dialects.

Referring to FIG. 1, the user 102 speaks an utterance which is detected by a microphone of the client device 110. The client device 110 generates audio data 112 that indicates acoustic properties of the utterance. The client device 110 may represent any appropriate device, such as a phone, a tablet computer, a laptop computer, a desktop computer, a wearable computer, a navigation system, an entertainment device, a home appliance, a vehicle, a digital assistant device, and so on.

The client device 110 sends the audio data 112 to the server system 120 over the communication network 130. The client device optionally determines and sends data indicating a language and/or dialect of the user 102. For example, the client device 110 can store and retrieve a language or dialect identifier 144 and provide the identifier 144 to the server system 120 over the communication network 130. In some implementations, the server system 120 stores a language or dialect identifier 144 in data storage 122, for example, in a user profile for the user 102. The server system 120 may receive, from the client device 110, a user identifier for the user 102 or device identifier for the client device 110 in connection with the audio data 112. The server system 120 may then access stored mapping data that indicates, for the user identifier or device identifier, a corresponding language or dialect identifier 144.

The server system 120 then processes the audio data 112 to determine a transcription 148. In particular, the server system 120 determines speech feature scores 142, such as mel-frequency cepstral coefficients (MFCCs) or log-mel feature scores. These speech feature scores 142 are provided as input to the speech recognition model 140. In some implementations, the speech recognition model 140 also receives the language or dialect identifier 144 for the user as an input, so that the processing of the speech recognition model 140 can be conditioned on a priori knowledge of the language and/or dialect of the user 120, which can lead to increased accuracy of recognition. In other implementations, the speech recognition model 140 is configured so that no language or dialect identifier 144 is input to the model, e.g., so the model 140 processes the speech feature scores 142 without an indication of a predetermined language or dialect of the user 102.

The speech recognition model 140 can be trained using examples of speech in multiple different languages and/or dialects, as discussed further below. As discussed for FIGS. 2A-2B, the model 140 may be of the listen-attend-spell (LAS) type. The model 140 may be trained to provide model outputs 146 indicating the likelihoods of different linguistic units, such as graphemes. For example, the model may output a vector that includes a probability score for each of the graphemes in the set of languages and/or dialects that the model 140 is trained to recognize. In other implementations, types of linguistic units other than graphemes may be used, such as word pieces.

The server system 120 uses the model outputs 146 to determine a transcription 148 of the utterance. For example, the server system 120 may determine the most likely grapheme or other linguistic unit for each output vector from the speech recognition model 140. This may involve selecting the linguistic unit assigned the highest probability for each output vector. In some implementations, it may involve using a beam search algorithm to select a path through a lattice generated based on the model outputs 146. The selected sequence of linguistic units may also be processed with a set of rules or models to regularize spelling, grammar, punctuation, etc. in the transcription 148.

The server system 120 can provide the transcription 148 (e.g., as text data) to the client device 110 over the communication network 130. For example, if the client device 110 is in a dictation mode, e.g., receiving an utterance for entry to a field of a user interface, the client device 110 may provide the text of the transcription 148 as output on a display of the client device, e.g., in a text entry field or other user interface area. The server system 120 may additionally or alternatively use the transcription 148 in other ways. For example, the utterance may be a request directed to a digital conversational assistant, and the server system 120 may examiner the transcription to identify what action is requested (e.g., initiate a search, answer a question, start a call, set a timer, add an item to a list, etc.). The server system 120 may detect that the requested action involves another system, such as another server system, and may provide the transcription 148 or data generated based on the transcription to the other server system. For example, the utterance may be a request to make a reservation at a restaurant, and the server system 120 may identify a third-party server that handles reservations for the restaurant. Based on the content of the transcription 148 (and potentially transcriptions of other utterances of the user in a dialogue with a digital assistant), the server system 120 may formulate a request, sent according to an API of a reservation server system, for the reservation the user 102 mentioned.

The example of FIG. 1 shows the speech recognition model 140 stored and executed by the server system 120. In other implementations, the speech recognition model 140 is stored and used locally by the client device 110.

Figure 2A:
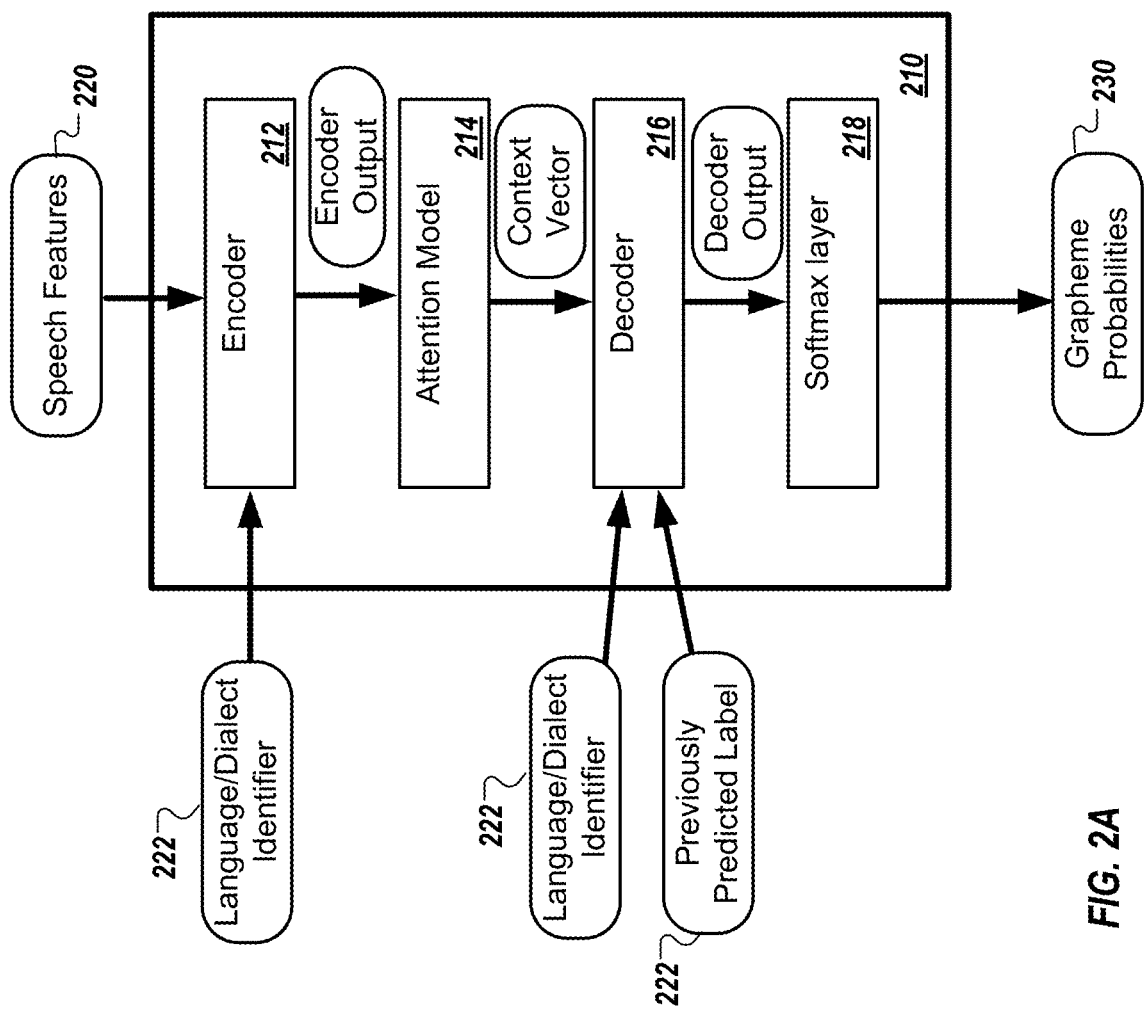
FIGS. 2A and 2B are diagrams illustrating examples of speech recognition models for multi-dialect and multilingual speech recognition.
Figure 2B:
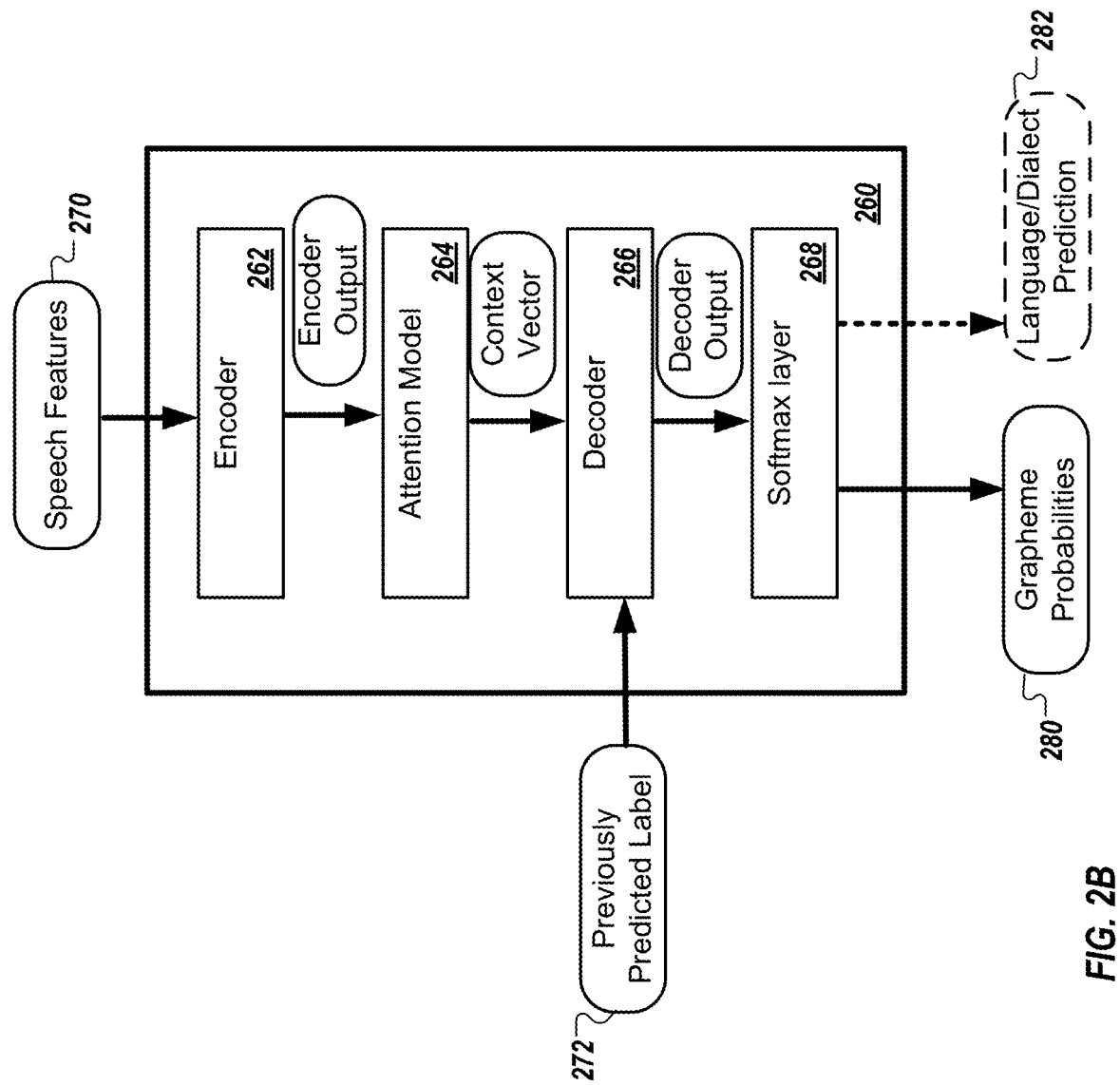

FIGS. 2A and 2B are diagrams illustrating examples of speech recognition models for multi-dialect and multilingual speech recognition. FIG. 2A shows an example in which a language and/or dialect identifier is provided to a model 210 to generate a prediction. FIG. 2A shows an example in which a model 260 has been trained to infer a language and/or dialect from input speech features, and so no language and/or dialect identifier is provided when generating a prediction. Either of the models 210, 260 may be used as the model 140 of FIG. 1.

In FIG. 2A, a speech recognition model 210 includes an encoder 212, an attention model 214, a decoder 216, and a softmax layer 218. The encoder 212 is a neural network including, for example, multiple recurrent layers. As an example, a stack of unidirectional long short-term memory (LSTM) layers can be used. The attention model determines attention weights for each frame in the encoder output, in order to compute a context vector. The context vector is provided as input to the decoder 216, which produces a decoder output vector. The decoder 216 can include a stack of multiple recurrent neural network layers, such as LSTM layers. A softmax layer operates on the decoder output to generate grapheme probabilities 230, e.g., a distribution over all grapheme labels in the multiple languages and/or dialects that the model 214 is trained to recognize.

One or more of the elements of the model 210 receive a language and/or dialect identifier 222. As discussed below, this identifier 222 may be expressed in any of a variety of forms, including as a one-hot vector, a number (e.g., a real number embedding that encodes the identify of the language and/or dialect), a language and/or dialect cluster identifier, and so on. The identifier 222 may be input to any combination of layers of the encoder 212 neural network, e.g., to a first layer, a last layer, to all layers, or to some other subset of layers of the encoder. The identifier 222 may be input to any combination of layers of the decoder 216 neural network, e.g., to a first layer, a last layer, to all layers, or to some other subset of layers of the decoder. In addition or as an alternative, the identifier 222 may be provided as input to the attention model 214 and/or the softmax layer 218. To provide the identifier 222 to these components of the model 210, the identifier 222 may be concatenated to the other input to the layer. For example, the identifier 222 may be concatenated to the vector of input speech features 220 to form an input vector for the first layer of the encoder 212.

Referring to FIG. 2B, the speech recognition model 260 is structured similar to the model 210 of FIG. 2B, but has been trained to predict a language and/or dialog based on the input speech features 270 rather than being explicitly provided an identifier specifying the language and/or dialect. Similar to the model 210, the model 260 has an encoder 262 that received speech features 270 as input and provides an encoder output. An attention model 264 receives the encoder output and generates a context vector. A decoder 266 receives the context vector and an indication of the previously predicted label 272, and uses those inputs to generate a decoder output. Through training, the model 260 can learn to infer the language and/or dialect of the input speech features 270, and this inference can be reflected in the internal state and outputs of the model 260 (e.g., encoded in memory of and/or outputs of the encoder 262, attention model 264, and/or decoder 266).

A softmax layer 268 operates on the decoder output to generate grapheme probabilities 280, e.g., a distribution over all grapheme labels in the multiple languages and/or dialects that the model 214 is trained to recognize. In the example of FIG. 2B, the model 210 has also been trained with an objective to classify the language and/or dialect of the utterance represented by the speech features 270. The softmax layer 268 is configured to provide a language and/or dialect prediction 282 in addition to providing the grapheme probabilities 280. Typically, the language and/or dialect prediction 282 is not needed during speech recognition, as the grapheme probabilities 280 can be used to determine a transcription. Nevertheless, the language and/or dialect prediction 282 is used during training of the model 260, and the parameters of the model 260 are adjusted so that the model 260 can accurately predict the language and/or dialect of speech. This process helps the model 260 better distinguish situations when sounds may represent different words or graphemes in different languages, leading to a overall more accurate speech recognition result. In the example of FIG. 2B, the language or dialect need not be known in advance or be provided to the model 260.

Multi-dialect LAS models will now be described in further detail. The LAS model consists of an encoder (which functions similar to an acoustic model), a decoder (with functions similar to a language model) and an attention model which learns an alignment between the encoder and decoder outputs. The encoder is normally a stack of recurrent layers; 5 layers of unidirectional long short-term memory (LSTM) are used. The decoder can act as a neural language model, for example, 2 LSTM layers. The attention module takes in the decoder's lowest layer's state vector from the previous time step and estimates attention weights for each frame in the encoder output in order to compute a single context vector. The context vector is then input into the decoder network, along with the previously predicted label from the decoder to generate logits from the final layer in the decoder. Finally, these logits are input into a softmax layer, which outputs a probability distribution over the label inventory (i.e., graphemes), conditioned on all previous predictions. In conventional LAS models, the label inventory is augmented with two special symbols, <sos>, which is input to the decoder at the first time-step, and <eos>, which indicates the end of a sentence. During inference, the label prediction process terminates when the <eos> label is generated.

The baseline multi-dialect LAS system is built by simply pooling all the data together. The output targets are 75 graphemes for English, which are shared across dialects. The baseline multi-dialect LAS model can be improved by providing dialect information. In some implementations, this information is known in advance or can be easily obtained. Explicitly providing such dialect information can be helpful to improve the performance of the multi-dialect LAS model. Three ways of passing the dialect information into the LAS model are discussed, namely (1) feeding it as output targets, (2) providing it as input vectors, or (3) directly factoring the encoder layers based on the dialect.

Dialect information can be incorporated in a model using dialect output targets during training. One way to make the LAS model aware of the dialect is through multi-task learning. An extra dialect classification cost can be added to the training to regularize the model to learn hidden representations that are effective for both dialect classification and grapheme prediction. However, this involves having two separate objective functions that are weighted, and deciding the optimal weight for each task is a parameter that needs to be swept.

A simpler approach, similar to, is to expand the label inventory of the LAS model to include a list of special symbols, each corresponding to a dialect. For example, when including the British English, the symbol <en-gb> can be added into the label inventory. The special symbol is added to the beginning of the target label sequence. For example, for a British accented speech utterance of "hello world", the conventional LAS model uses "<sos> h e l l o o ␣ w o r l d <eos>" as the output targets; in the new setup the output target is "<sos> <en-gb> h e l l o o ␣ w o r l d <eos>". The model needs to figure out which dialect the input speech is first before making any grapheme prediction.

In LAS, each label prediction is dependent on the history of inputs in the sequence. Adding the dialect symbol at the beginning creates dependency of the grapheme prediction on the dialect classification. When the model makes errors in dialect classification, it may hurt the grapheme recognition performance. It is assumed that the correct dialect information is always available. The insertion of the dialect symbol at the end of the label sequence is explored. For the example utterance, the target sequence now become "<sos> h e l l o o ␣ w o r l d <en-gb> <eos>". By inserting the dialect symbol at the end, the model still needs to learn a shared representation but avoids the unnecessary dependency and is less sensitive to dialect classification errors.

Dialect information can be provided to a model as input vectors. Another way of providing dialect information is to pass this information as an additional feature. To convert the categorical dialect information into a real-valued feature vector, the use of 1-hot vectors, whose values are all '0' except for one '1' at the index corresponding to the given dialect, and data-driven embedding vectors whose values are learned during training is investigated. The dialect vectors can be appended to different layers in the LAS model. At each layer the dialect vectors are linearly transformed by the weight matrices and added to the original hidden activations before the nonlinearity. This effectively enables the model to learn dialect-dependent biases. Two configurations are considered: (1) adding it to the encoder layers, which effectively provides dialect information to help model the acoustic variations across dialects; and (2) appending it to the decoder layers, which models dialect-specific language model variations. The two configurations can be combined by feeding dialect vectors into both the encoder and the decoder.

Dialect information can be used in modeling as cluster coefficients. Another approach to modeling variations in the speech signal (for example, variations in dialects) is cluster adaptive training (CAT). Each dialect can be treated as a separate cluster and use 1-hot dialect vectors to switch clusters; alternatively, data-driven dialect embedding vectors can be used as weights to combine clusters. A drawback of the CAT approach is that it adds extra network layers, which typically adds more parameters to the LAS model. A goal is to maintain simplicity of the LAS model and limit the increase in model parameters. A simple CAT setup for the encoder of the LAS model can be tested to compare with the input vector approaches discussed in the previous sections. A few clusters can be used to compensate activation offsets of the 4th LSTM layer based on the shared representation learned by the 1st LSTM layer, to account for the dialect differences. For each cluster, a single layer 128D LSTM is used with output projection to match the dimension of the 4th LSTM layer. The weighted sum of all the CAT bases using dialect vectors as interpolation weights is added back to the 4th LSTM layer's outputs, which are then fed to the last encoder layer.

Experimental details are now described. Various experiments were conducted on about 40K hours of noisy training data including 35M English utterances. The training utterances are anonymized and hand-transcribed, and are representative of Google's voice search traffic. It includes speech from 7 different dialects, namely America (US), India (IN), Britain (GB), South Africa (ZA), Australia (AU), Nigeria & Ghana (NG) and Kenya (KE). The amount of dialect-specific data can be found in Table 1. The training data is created by artificially corrupting clean utterances using a room simulator, adding varying degrees of noise and reverberation such that the overall SNR is between 0 and 20 dB. In this example, the noise sources are from YouTube and daily life noisy environmental recordings. The results below are for dialect-specific test sets, each of which contains roughly 10K anonymized, hand-transcribed utterances from Google's voice search traffic without overlapping with the training data. This amounts to roughly 11 hours of test data per dialect. The experiments used 80-dimensional log-mel features, computed with a 25 ms window and shifted every 10 ms. In some implementations, at the current frame, t, the features are stacked with 3 frames to the left and down sampled to a 30 ms frame rate. In the baseline LAS model, the encoder network architecture has 5 unidirectional 1024D LSTM layers. Additive attention was used. In these examples, the decoder network is a 2-layer 1024D unidirectional LSTM. The networks were trained to predict graphemes, which have 75 symbols in total. The model has a total number of 60.6M parameters. The networks were trained with the cross-entropy criterion, using asynchronous stochastic gradient descent (ASGD) optimization, in TensorFlow. The training terminated when the change of WERs on a develpment set was less than a given threshold for certain number of steps.

TABLE 1

Number of utterances per dialect for training (M for million) and testing (K for thousand).

| Dialect | US | IN | GB | ZA | AU | NG | KE |
|---|---|---|---|---|---|---|---|
| Train(M) | 13.7 | 8.6 | 4.8 | 2.4 | 2.4 | 2.1 | 1.4 |
| Test(K) | 12.9 | 14.5 | 11.1 | 11.7 | 11.7 | 9.8 | 9.2 |

Results from the various models are now described. The first approach is simply pooling of all data from multiple dialects. A single grapheme LAS model is built on all the data together (S1 in Table 2 below). For comparison, a set of dialect-dependent models was built. Due to the large variations in the amount of data for each dialect, a lot of tuning is required to find the best model setup from scratch for each dialect. For the sake of simplicity, the joint model is used as the starting point and retraining the same architecture for each dialect independently (S2 in Table 2). Instead of updating only the output layers it was found that re-estimating all the parameters provides better results. To compensate for the extra training time the fine-tuning adds, the baseline model was also trained for similar number of extra steps. Comparing the dialect-independent model (S1) with the dialect-dependent ones (S2), simply pooling the data together gives acceptable recognition performance, but having a language-specific model by fine-tuning still achieves better performance.

Results of using dialect-specific information are now described. The next set of experiments look at using dialect information to see if a joint multi-dialect model can improve performance over the dialect-specific models (S2) in Table 2.

TABLE 2

WER (%) of dialect-independent (S1) and dialect-dependent (S2) LAS models.

| Dialect | US | IN | GB | ZA | AU | NG | KE |
|---|---|---|---|---|---|---|---|
| S1 | 10.6 | 18.3 | 12.9 | 12.7 | 12.8 | 33.4 | 19.2 |
| S2 | 9.7 | 16.2 | 12.7 | 11.0 | 12.1 | 33.4 | 19.0 |

Results using dialect information as output targets are described. A first approach adds the dialect information into the target sequence. Two setups are explored, namely adding at the beginning (S3) and adding at the end (S4). The results are presented in Table 3. Inserting the dialect symbol at the end of the label sequence is much better than at the beginning, which eliminates the dependency of grapheme prediction on the erroneous dialect classification. S4 is more preferable and outperforms the dialect-dependent model (S2) on all the dialects except for IN and ZA.

TABLE 3

WER (%) of inserting dialect information at the beginning (S3) or at the end (S4) of the grapheme sequence.

| Dialect | US | IN | GB | ZA | AU | NG | KE |
| --- | --- | --- | --- | --- | --- | --- | --- |
| S2 | 9.7 | 16.2 | 12.7 | 11.0 | 12.1 | 33.4 | 19.0 |
| S3 | 9.9 | 16.6 | 12.3 | 11.6 | 12.2 | 33.6 | 18.7 |
| S4 | 9.4 | 16.5 | 11.6 | 11.0 | 11.9 | 32.0 | 17.9 |

Results using dialect information as input vectors are described. An experiment with directly feeding the dialect information into different layers of the LAS model is performed. The dialect information is converted into an 8D vector using either 1-hot representation or an embedding vector learned during training. This vector is then appended to both the inputs and hidden activations. The following information allows the usefulness of the dialect vector to the LAS encoder and decoder to be evaluated. From Table 4, feeding it to encoder (S5) gives gains on dialects with less data (namely GB, ZA, AU, NG and KE) and has comparable performance for US data, but is still a bit worse for IN data compared to the fine-tuned dialect-dependent models (S2). The dialect vector (using both 1-hot and learned embedding) is passed to the decoder of LAS (S6). Table 4 shows that the single multi-dialect LAS model outperforms the individually fine-tuned dialect-dependent models on all dialects except for IN, for which it obtains the same performance.

TABLE 4

WER (%) of feeding the dialect information into the LAS model's encoder (S5), decoder (S6) and both (S7). The dialect information is converted into an 8D vector using either 1-hot representation (1hot) or learned embedding (emb).

| Dialect | US | IN | GB | ZA | AU | NG | KE |
| --- | --- | --- | --- | --- | --- | --- | --- |
| S2 | 9.7 | 16.2 | 12.7 | 11.0 | 12.1 | 33.4 | 19.0 |
| S5(1hot) | 9.6 | 16.4 | 11.8 | 10.6 | 10.7 | 31.6 | 18.1 |
| S5(emb) | 9.6 | 16.7 | 12.0 | 10.6 | 10.8 | 32.5 | 18.5 |
| S6(1hot) | 9.4 | 16.2 | 11.3 | 10.8 | 10.9 | 32.8 | 18.0 |
| S6(emb) | 9.4 | 16.2 | 11.2 | 10.6 | 11.1 | 32.9 | 18.0 |
| S7(1hot) | 9.1 | 15.7 | 11.5 | 10.0 | 10.1 | 31.3 | 17.4 |

The models that used 1-hot representations and learned embeddings performed similarly, for both the encoder and decoder. It is most likely the small dimensionality of the vectors used (i.e., 8D) that is insufficient to suggest any preference between the 1-hot representation and the learned embedding. In future, when scaling up to more dialects/languages, using embedding vectors instead of 1-hot to represent a larger set of dialects/languages could be more efficient.

Feeding dialect vectors into different layers effectively enables the model to explicitly learn dialect-dependent biases. For the encoder, these biases would help capture dialect-specific acoustic variations; while in the decoder, they can potentially address the language model variations. Experimental results suggest that these simple biases indeed help the multi-dialect LAS model. To understand the effects, the systems S5(1 hot) and S6(1 hot) are tested with mismatched dialect vector on each test set.

Figure 3A:
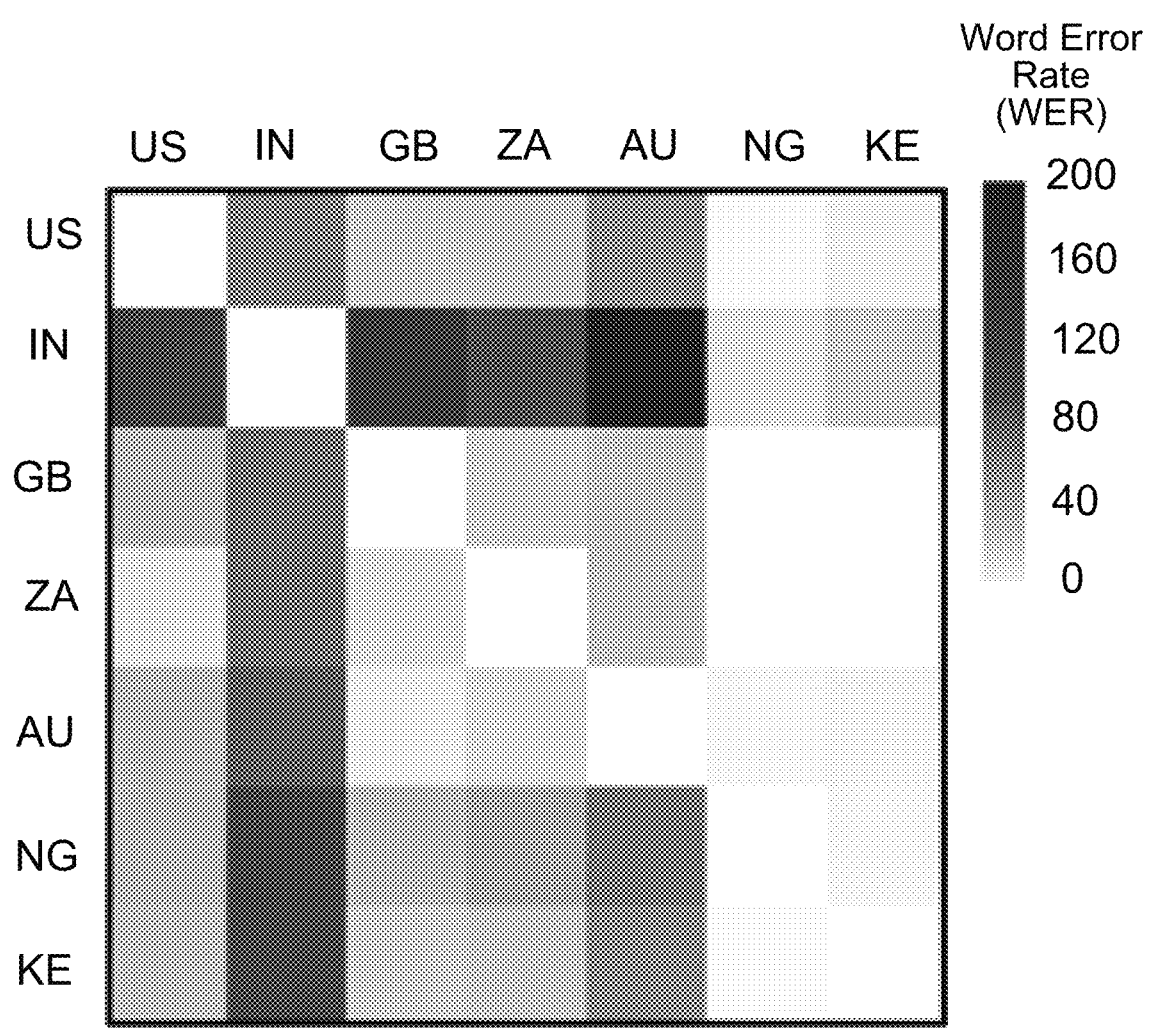
FIGS. 3A and 3B are diagrams of relative word error rate (WER) changes when feeding in incorrect dialect vectors (rows) to the encoder and the decoder for each test set (columns).
Figure 3B:
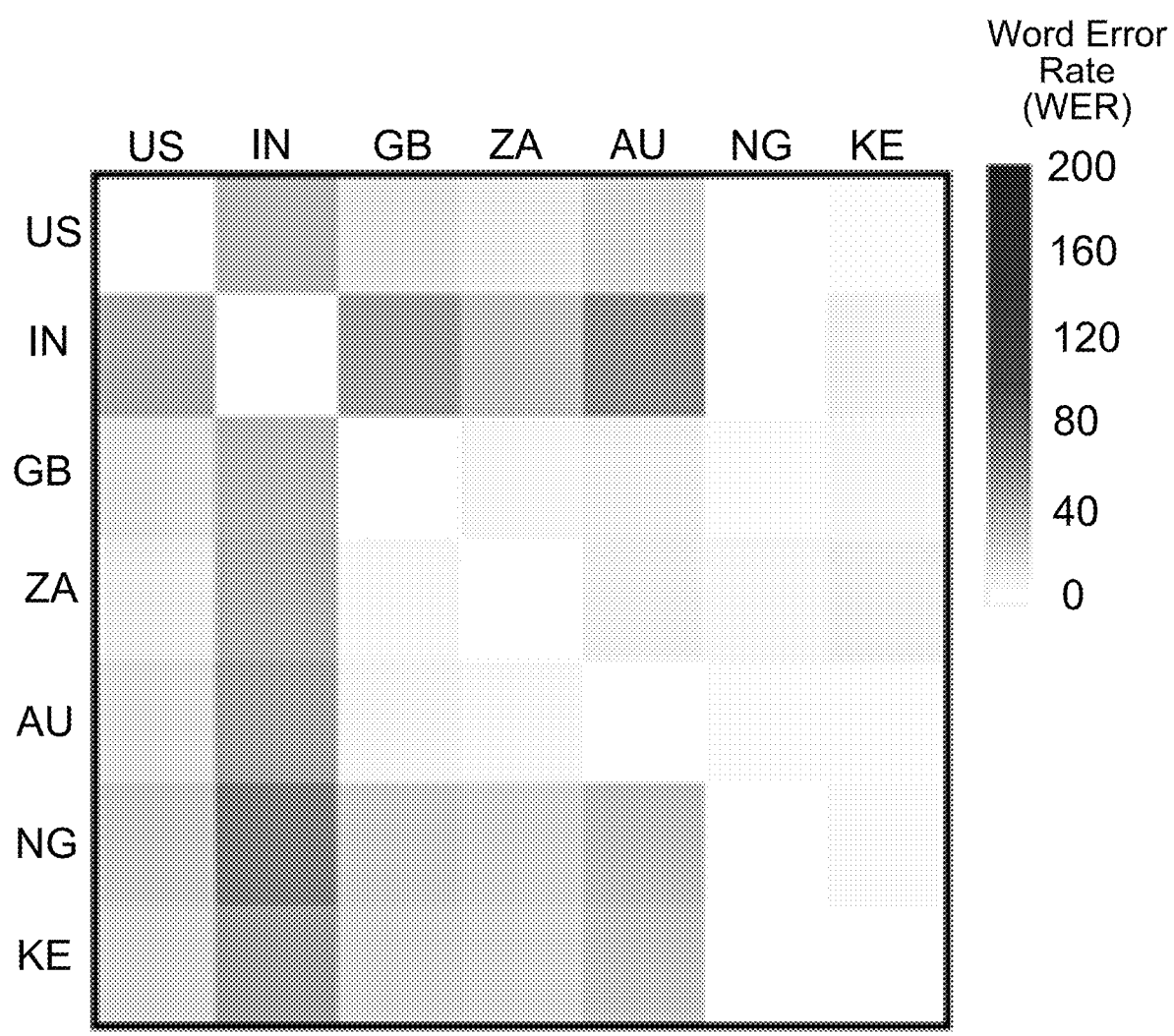

FIGS. 3A and 3B illustrate the relative WER changes when feeding in incorrect dialect vectors (rows) to the encoder or decoder for each test set (columns). Each row represents the dialect vector fed into the model and each column corresponds to a dialect-specific test set. The light diagonal blocks are the "correct" setups, where the correct dialect vector is fed on each test set. The darker shading represents the relative increase of WERs. The darker the shade is, the larger the change is. Comparing the effect on encoder and decoder, incorrect dialect vectors degrade accuracy more on encoders, suggesting more acoustic variations across dialects than language model differences. Across different dialects, IN seems to have the most distinguishable characteristics. NG and KE, the two smallest dialects, benefit more from the sharing of parameters as the performance varies little with different dialect vectors. The results suggest the proposed model is capable of handling the unbalanced dialect data properly, learning strong dialect-dependent biases when there is enough data and sticking to the shared model otherwise. Another interesting observation is that, for these two dialects, feeding dialect vectors from ZA is slightly better than using their own. The results suggest that in future pooling similar dialects with less data may give better performance.

One evidence that the model successfully learns dialect-specific lexicons is "color" in US vs. "colour" in GB. On the GB test set, the system without any explicit dialect information (S1) and the one feeding it only to encoder layers (S5) generate recognition hypotheses with both "color" and "colour" although "color" appears much less frequently (FIG. 3A). However, for the model S6, where the dialect information is directly fed into decoder layers, only "colour" appears; moreover, if the dialect vector is fed for US to S6 on the GB test set, the model successfully switches all the "colour" predictions to "color" (FIG. 3B). Similar observations are found for "labor" vs. "labour", "center" vs. "centre" etc.

The 1-hot dialect vector is fed into all the layers of the LAS model (S7). Experimental results (Table 4) show that the system outperforms the dialect-dependent models on all the test sets, with the largest gains on AU (16.5% relative WER reduction).

Results were also obtained using dialect information as cluster coefficients. Instead of directly feeding the dialect vector as inputs to learn a simple bias, the dialect vector can additionally or alternatively be used as a cluster coefficient vector to combine multiple clusters and learn more complex mapping functions. For comparisons, a simple CAT system (S8) is implemented only for the encoder. Experimental results in Table 5 show that unlike directly feeding dialect vectors as inputs, CAT favors more learned embeddings (S8(emb)), which encourages more parameter sharing across dialects. In addition, comparing this to directly using dialect vectors (S5(1 hot)) for the encoder, CAT (S8(emb)) is more effective on US and IN and similar on other dialects. However, in terms of model size, comparing to the baseline model (S1), S5(1 hot) only increases by 160K parameters, while S8(emb) adds around 3M extra.

TABLE 5

WER (%) of a CAT encoder LAS system (S8) with 1-hot (1hot) and learned embedding (emb) dialect vector.

| Dialect | US | IN | GB | ZA | AU | NG | KE |
| --- | --- | --- | --- | --- | --- | --- | --- |
| S2 | 9.7 | 16.2 | 12.7 | 11.0 | 12.1 | 33.4 | 19.0 |
| S5(1hot) | 9.6 | 16.4 | 11.8 | 10.6 | 10.7 | 31.6 | 18.1 |
| S8(1hot) | 9.9 | 17.0 | 12.1 | 11.0 | 11.6 | 32.5 | 18.3 |
| S8(emb) | 9.4 | 16.1 | 11.7 | 10.6 | 10.6 | 32.9 | 18.1 |

The adaptation strategies discussed above can be combined. The joint dialect identification (S4) is integrated and the use of dialect vectors (S7(1 hot)) into a single system (S9). The performance of the combined multi-dialect LAS system is presented in Table 6. It works much better than doing joint dialect identification (S4) alone, but has similar performance to the one uses dialect vectors (S7(1 hot)). This is because when feeding in dialect vectors into the LAS model, especially in the decoder layers, the model is already doing a very good job in predicting the dialect. Specifically, the dialect prediction error for S9 on the dev set during training is less than 0.001% compared to S4's 5%. Overall, the best multi-dialect system (S7(1 hot)) outperforms dialect-specific models and achieves 3.1~16.5% WER reductions across dialects.

TABLE 6

WER (%) of the combined multi-dialect LAS system (S9).

| Dialect | US | IN | GB | ZA | AU | NG | KE |
|---|---|---|---|---|---|---|---|
| S2 | 9.7 | 16.2 | 12.7 | 11.0 | 12.1 | 33.4 | 19.0 |
| S4 | 9.4 | 16.5 | 11.6 | 11.0 | 11.9 | 32.0 | 17.9 |
| S7(1hot) | 9.1 | 15.7 | 11.5 | 10.0 | 10.1 | 31.3 | 17.4 |
| S9 | 9.1 | 16.0 | 11.4 | 9.9 | 10.3 | 31.4 | 17.5 |

A multi-dialect end-to-end LAS system trained on multiple dialects of a single language can improve speech recognition accuracy compared to a collection of individual models. The model utilizes a 1-hot dialect vector at each layer of the LAS encoder and decoder to learn dialect specific biases. It is optimized to predict the grapheme sequence appended with the dialect name as the last symbol, which effectively forces the model to learn shared hidden representations that are suitable for both grapheme prediction and dialect classification. Experimental results show that feeding a 1-hot dialect vector is very effective in boosting the performance of a multi-dialect LAS system, and allows it to outperform a LAS model trained on each individual language. Furthermore, using CAT could potentially be more powerful in modeling dialect variations though at a cost of increased parameters.

In some implementations, a Listen, Attend and Spell (LAS) attention-based sequence-to-sequence ASR model modified to support recognition in multiple languages.

An LAS sequence-to-sequence model has three modules: an encoder, decoder and attention network which are trained jointly to predict a sequence of graphemes from a sequence of acoustic feature frames.

The system uses 80-dimensional log-mel acoustic features computed every 10 ms over a 25 ms window. Following, 8 consecutive frames are stacked and stride the stacked frames by a factor of 3. The down-sampling enables the use of a simpler encoder architecture. The encoder is comprised of a stacked bidirectional recurrent neural network (RNN) that reads acoustic features $x=(x_1, \ldots, x_K)$ and outputs a sequence of high-level features (hidden states) $h=(h_1, \ldots, h_K)$. The encoder is similar to the acoustic model in an ASR system.

The decoder is a stacked unidirectional RNN that computes the probability of a sequence of characters y as follows:

$$P(y|x) = P(y|h) = \sum_{t=1}^{T} P(y_t|h, y_{<t})$$

The conditional dependence on the encoder state vectors h is represented by context vector $c_t$, which is a function of the current decoder hidden state and the encoder state sequence:

$$u_{it} = v^T \tanh(W_h h_i + W_d d_t + b_a)$$

$$\alpha_t = \text{softmax}(u_t)$$

$$c_t = \sum_{i=1}^{K} \alpha_{it} h_i$$

where the vectors v, $b_a$ and the matrices $W_h$, $W_d$ are learnable parameters; $d_t$ is the hidden state of the decoder at time step t.

The hidden state of the decoder, $d_t$, which captures the previous character context $y_{<t}$, is given by:

$$d_t = RNN(\tilde{y}_{t-1}, d_{t-1}, c_{t-1})$$

where $d_{t-1}$ is the previous hidden state of the decoder, and $\tilde{y}_{t-1}$ is a character-embedding vector for $y_{t-1}$, as is typical practice in RNN-based language models. The decoder is analogous to the language model component of a pipeline system for ASR. The posterior distribution of the output at time step t is given by:

$$P(y_t|h, y_{<t}) = \text{softmax}(W_s[c_t; d_t] + b_s)$$

where $W_s$ and $b_s$ are again learnable parameters. The model is trained to optimize the discriminative loss:

$$L_{LAS} = -\log(P(y|x))$$

Multilingual models are described. In the multilingual scenario, n languages $\{L_1, \ldots, L_n\}$ are given, each with independent character sets $\{C_1, C_2, \ldots, C_n\}$ and training sets $\{(X_1, Y_1), \ldots, (X_n, Y_n)\}$. The combined training dataset is thus given by the union of the datasets for each language:

$$(x,y) = \cup_{i=1}^{n}(X_i, Y_i)$$

and the character set for the combined dataset is similarly given by:

$$C = \cup_{i=1}^{n} C_i$$

One way to train the model is to jointly train components of the model with multiple objectives. Training is done for a joint model, including the LAS model described in the previous section trained directly on the combined multilingual dataset. This model is not given any explicit indication that the training dataset is composed of different languages. However, the model is able to recognize speech in multiple languages despite the lack of runtime language specification.

Multitask learning can be used to train the model according to multiple objectives concurrently. A variant of the joint model, which has the same architecture is tested and trained in a multitask learning (MTL) configuration to jointly recognize speech and simultaneously predict its language. The language ID annotation is thus utilized during training, but is not passed as an input during inference. In order to predict the language ID, the encoder output h is averaged across all time frames to compute an utterance-level feature. This averaged feature is then passed to a softmax layer to predict the likelihood of the speech belonging to each language:

$$p(\mathcal{L}|x) = \text{softmax}\left(W_{lang} \frac{1}{K} \sum_i h_i + b_{lang}\right)$$

The language identification loss is given by:

$$L_{LID} = -\log(p(\mathcal{L}=\mathcal{L}_j|x))$$

where the j-th language, $L_j$, is the ground truth language. The two losses are combined using an empirically determined weight $\lambda$ to obtain the final training loss:

$$L_{MTL} = \frac{1}{1+\lambda}L_{LAS} + \frac{\lambda}{1+\lambda}L_{LID}$$

Another approach is to generate conditional models. A set of conditional models can utilize the language ID during inference. Intuitively, it is expected that a model which is explicitly conditioned on the speech language will have an easier time allocating its capacity appropriately across languages, speeding up training and improving recognition performance.

A fixed-dimensional language embedding can be used for each language to condition different components of the basic joint model on language ID. The conditioning is achieved by feeding in the language embedding as an input to the first layer of encoder, decoder or both giving rise to (a) Encoder-conditioned, (b) Decoder-conditioned, and (c) Encoder+Decoder-conditioned variants. In contrast to the MTL model, the language ID is not used as part of the training cost.

The results below are for experiments on data from nine Indian languages shown in Table 7, which corresponds to a total of about 1500 hours of training data and 90 hours of test data. The nine languages have little overlap in their character sets, with the exception of Hindi and Marathi which both use the Devanagari script. The small overlap means that the output vocabulary for the multilingual models, which is union over character sets, is also quite large, containing 964 characters. Separate validation sets of around 10 k utterances per language are used for hyper parameter tuning. All the utterances are dictated queries collected using desktop and mobile devices.

deviation of 0.01 is added to all parameters after 20 k training steps. All the monolingual models converge within 200-300 k gradient steps.

Since the multilingual training corpus is much larger, a joint larger multilingual model was trained without overfitting. As with the training set, the validation set is also a union of the language-specific validation sets. A configuration can use a 5-layer encoder comprised of 700 biLSTM cells, and a 2-layer decoder containing 1024 LSTM cells in each layer. For the multitask model, $\lambda$=0.01 among {0.1, 0.01} to work the best. These restricted values are used because for a very large $\lambda$, the language ID prediction task would dominate the primary task of ASR, while for a very small $\lambda$ the additional task would have no effect on the training loss. For all conditional models, a 5-dimensional language embedding is used. For regularization Gaussian weight noise is added with standard deviation of 0.0075 after 25 k training steps. All multilingual models are trained for approximately 2 million steps.

The models in these experiments were implemented in TensorFlow and trained using asynchronous stochastic gradient descent using 16 workers. The initial learning rate was set to 1e-3 for the monolingual models and 1e-4 for the multilingual models with learning rate decay.

Results of the language-specific LAS models and the joint LAS model trained on all languages are shown below. As shown in Table 8, the joint LAS model outperforms the language-specific models for all the languages. In fact, the joint model decreases weighted average WERs across all the 9 languages, weighted by number of words, by more than 21% relative to the monolingual models. The result is quite interesting because the joint model is a single model that is being compared to 9 different monolingual models and unlike the monolingual models the joint model it not language-aware at runtime. The large performance gain of the joint model is also attributable to the fact that the Indian languages are very similar in the phonetic space, despite using different grapheme sets.

TABLE 7

Multilingual Dataset Stastics

| Language | # training utts. | # test utts. |
|---|---|---|
| Bengali | 364617 | 14679 |
| Gujarati | 243390 | 14935 |
| Hindi | 213753 | 14718 |
| Kannada | 192523 | 14765 |
| Malayalam | 285051 | 14095 |
| Marathi | 227092 | 13898 |
| Tamil | 164088 | 9850 |
| Telegu | 232861 | 14130 |
| Urdu | 196554 | 14486 |
| Total | 2119929 | 125556 |

As a baseline, nine monolingual models were trained independently on data for each language. The hyper parameters are tuned on Marathi and reuse the optimal configuration to train models for the remaining languages. The best configuration for Marathi uses a 4 layer encoder comprised of 350 bidirectional long short-term memory (biLSTM) cells (i.e. 350 cells in forward layer and 350 cells in backward layer), and a 2 layer decoder containing 768 LSTM cells in each layer. For regularization, a small L2 weight penalty of 1e-6 is applied and Gaussian weight noise with standard

TABLE 8

WER (%) of language-specific, joint, and joint + MTL LAS models

| Language | Language-specific | Joint | Joint + MTL |
|---|---|---|---|
| Bengali | 19.1 | 16.8 | 16.5 |
| Gujarati | 26.0 | 18.0 | 18.7 |
| Hindi | 16.5 | 14.4 | 14.4 |
| Kannada | 35.4 | 34.5 | 34.6 |
| Malayalam | 44.0 | 36.9 | 36.7 |
| Marathi | 28.8 | 27.6 | 27.2 |
| Tamil | 13.3 | 10.7 | 10.6 |
| Telegu | 37.4 | 22.5 | 22.7 |
| Urdu | 29.5 | 26.8 | 26.7 |
| Weighted Avg. | 29.05 | 21.93 | 22.91 |

Second, the joint LAS model is compared with the multitask trained variant. As shown in the right two columns of Table 8, the MTL model shows limited improvements over the joint model. This might be due to the following reasons: (a) static choice of $\lambda$. Since the language ID prediction task is easier than ASR, a dynamic $\lambda$ which is high initially and decays over time might be better suited, and (b) the language ID prediction mechanism of averaging over encoder outputs might not be ideal. A learned weighting of the encoder outputs, similar to the attention module, might be better suited for the task.

Third, Table 9 shows that all the joint models conditioned on the language ID outperform the joint model. The encoder-conditioned model (Enc) is better than the decoder-conditioned model (Dec) indicating that some form of acoustic model adaptation towards different languages and accents occurs when the encoder is conditioned. In addition, conditioning both the encoder and decoder (Enc+Dec) does not improve much over conditioning just the encoder, suggesting that feeding the encoder with language ID information is sufficient, as the encoder outputs are then fed to the decoder anyways via the attention mechanism.

TABLE 9

WER (%) of LAS model and the joint language-conditioned models, namely decoder-conditioned (DEC), encoder-conditioned (Enc), and encoder + decoder conditioned (Enc + Dec)

| Language | Joint | Dec | Enc | Enc + Dec |
|---|---|---|---|---|
| Bengali | 16.8 | 16.9 | 16.5 | 16.5 |
| Gujarati | 18.0 | 17.7 | 17.2 | 17.3 |
| Hindi | 14.4 | 14.6 | 14.5 | 14.4 |
| Kannada | 34.5 | 30.1 | 29.4 | 29.2 |
| Malayalam | 36.9 | 35.5 | 34.8 | 34.3 |
| Marathi | 27.6 | 24.0 | 22.8 | 23.1 |
| Tamil | 10.7 | 10.4 | 10.3 | 10.4 |
| Telegu | 22.5 | 22.5 | 21.9 | 21.5 |
| Urdu | 26.8 | 25.7 | 24.2 | 24.5 |
| Weighted Avg. | 22.93 | 22.03 | 21.37 | 21.32 |

Comparing model performances across languages it appears that all the models perform worst on Malayalam and Kannada. It is hypothesized that this has to do with the agglutinative nature of these languages which makes the average word longer in these languages compared to languages like Hindi or Gujarati. For example, an average training set word in Malayalam has 9 characters compared to 5 in Hindi. In contrast to the WER, the character error rate (CER) for Hindi and Malayalam were quite close.

The ability of the proposed model to recognize multiple languages comes with the potential side effect of confusing the languages. The lack of script overlap between Indian languages, with the exceptions of Hindi and Marathi, means that the surface analysis of the script used in the model output is a good proxy to tell if the model is confused between languages or not. The analysis is conducted at the word level and check if the output words use graphemes from a single language or a mixture. The word is first tested on the ground truth language, and in case of failure, it is tested on other languages. If the word cannot be expressed using the character set of any single language, it is classified as mixed.

Figure 4A:
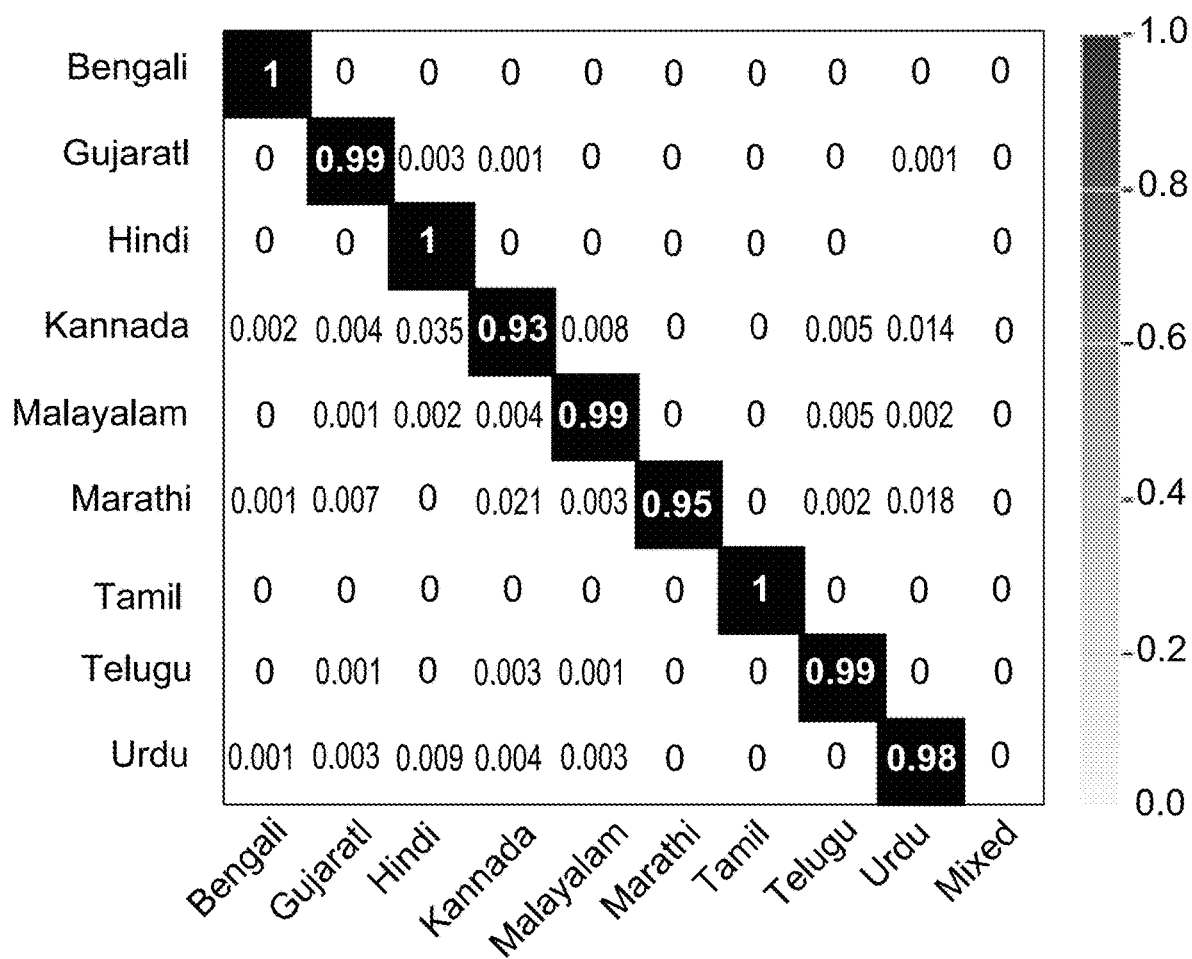
FIG. 4A is a diagram illustrating a language confusion matrix for a joint multilingual speech model.
Figure 4B:
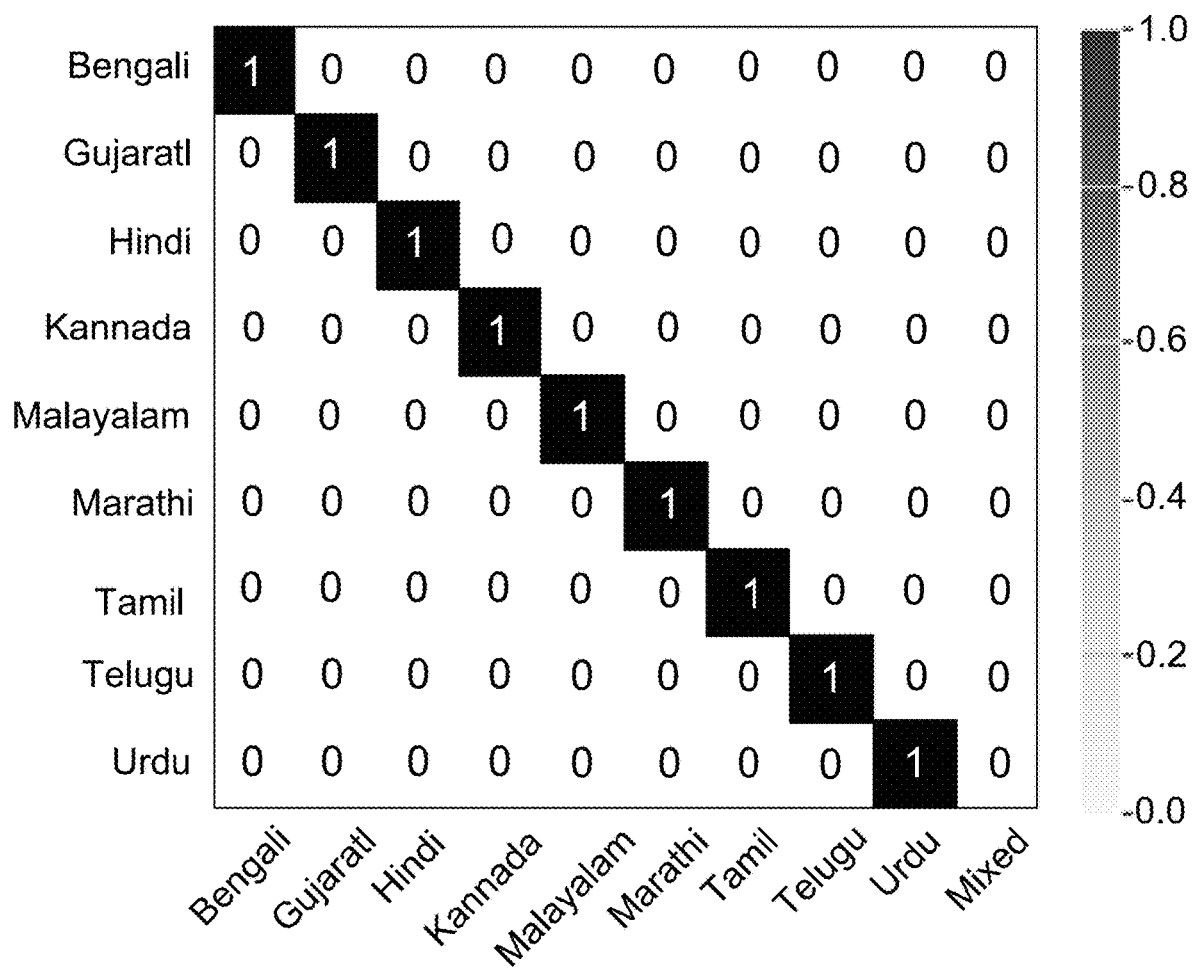
FIG. 4B is a diagram illustrating a language confusion matrix for an encoder-conditioned multilingual speech model.

FIGS. 4A and 4B illustrate the results for the joint and the encoder-conditioned model, respectively. While both models are rarely confused between languages, the result for the joint model is interesting given its lack of explicit language awareness, showing that the LAS model is implicitly learning to predict language ID. It is interesting to observe that by conditioning the joint model on the language ID, there is no confusion between languages. The joint model is rarely confused between languages, while conditioning removes those rare cases almost completely.

Another aspect to consider is whether the joint model can perform code-switching. The joint model in theory has the capacity to switch between languages. In fact, it can code-switch between English and the 9 Indian languages due to the presence of English words in the training data. One question is whether the model could also code-switch between a pair of Indian languages which was not seen during training. An artificial dataset was created by selecting about 1,000 Tamil utterances and appending them with the same number of Hindi utterances with a 50 ms break in between. The model does not code-switch—it picks one of the two scripts and sticks with it. Manual inspection shows that: (a) when the model chooses Hindi, it only transcribes the Hindi part of the utterance (b) similarly when the model chooses Tamil it only transcribes the Tamil part, but on rare occasions it also transliterates the Hindi part. This suggests that the language model is dominating the acoustic model and points to overfitting, which is a known issue with attention-based sequence-to-sequence models.

Another aspect to consider is what the conditioned model outputs for mismatched language ID. Basically, the question is whether the model obeys acoustics or is it faithful to the language ID. An artificial dataset of about 1,000 Urdu utterances labeled with the Hindi language ID was created and transcribed with the encoder-conditioned model. As it turns out, the model is extremely faithful to the language ID and sticks to Hindi's character set. Manual inspection of the outputs reveals that the model transliterates Urdu utterances in Hindi, suggesting that the model has learned an internal representation which disentangles the underlying acoustic-phonetic content from the language identity.

As discussed above, a sequence-to-sequence model multilingual speech recognition may recognize speech without any explicit language specification. Variants of the model conditioned on language identity can also be made. The proposed model and its variants substantially outperform baseline monolingual sequence-to-sequence models for all languages, and rarely choose the incorrect grapheme set in its output. The model, however, generally cannot perform code switching, suggesting that the language model is dominating the acoustic model. In some implementations, the conditional variants of the model can be integrated with separate language-specific language models to further improve recognition accuracy.

Figure 5:
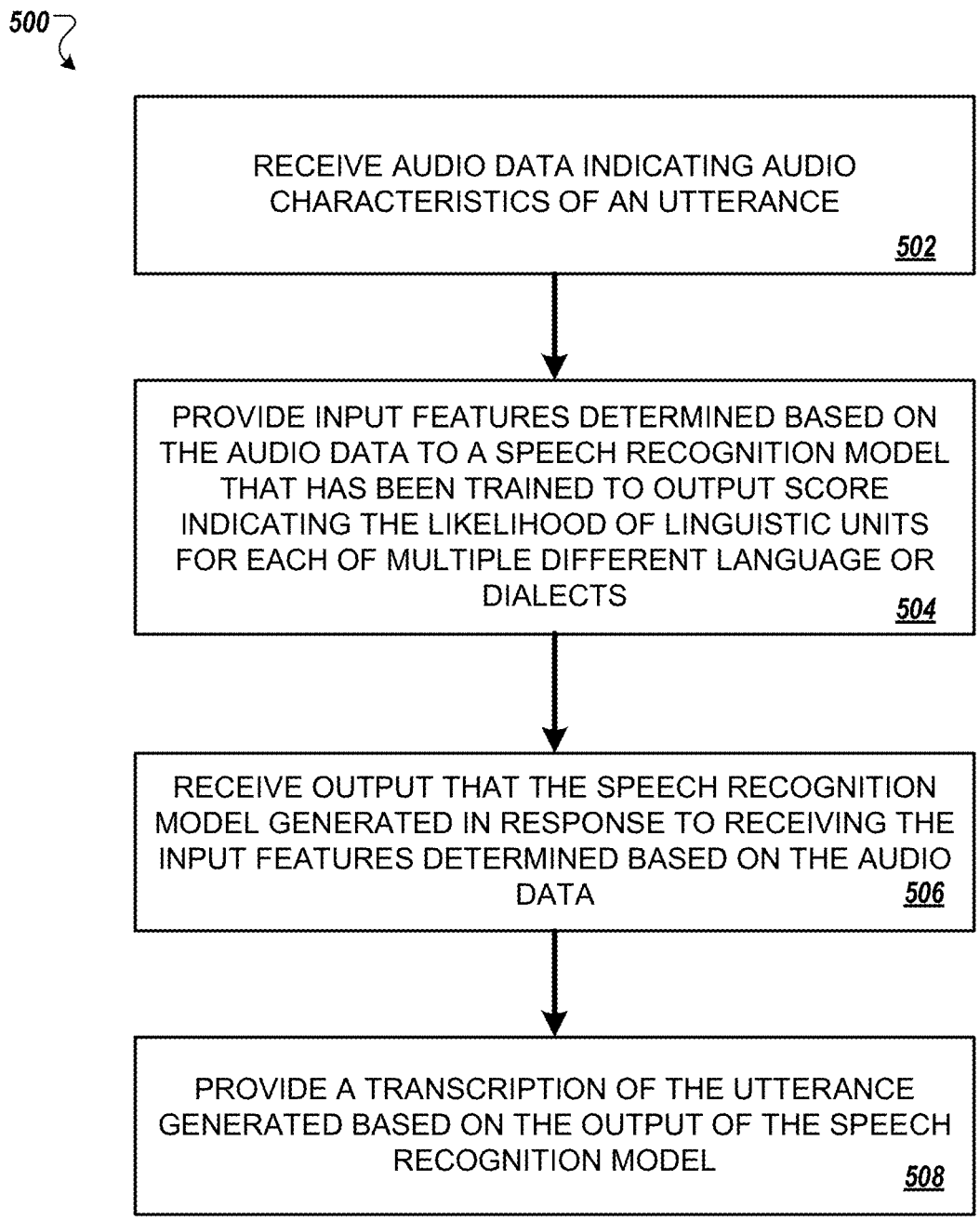
FIG. 5 is a flow diagram illustrating an example of a process for multi-dialect and multilingual speech recognition.

FIG. 5 is a flow diagram illustrating an example of a process 500 for multi-dialect and multilingual speech recognition. The process 500 can be performed by one or more computers of a speech recognition system.

The one or more computers receive audio data indicating audio characteristics of an utterance (502). For example, the audio data can include audio waveform data, compressed audio data, summarized audio data, etc.

The one or more computers provide input features determined based on the audio data to a speech recognition model that has been trained to output score indicating the likelihood of linguistic units for each of multiple different language or dialects (504). The speech recognition model can be one that has been trained using training examples representing speech in different languages or dialects and with data indicating languages or dialects of the training examples. Different types of speech recognition models can be used. Some models receive an input indicating a language or dialect of the utterance, and use this input to guide the recognition process. Other models are configured to determine (e.g., to predict or estimate) the language or dialect of the utterance based on the input features that indicate audio characteristics, and may provide an output indicating the language or dialect determined. Some models may not receive any input identifier for a language or dialect and may not output an indication of a determined language or dialect, but yet may have been trained using example utterances of different language and so may be able to distinguish the appropriate linguistic units for different acoustic patterns.

In some implementations, the speech recognition model has been trained using cluster adaptive training. Each language or dialect can correspond to a separate cluster, and each language or dialect has a corresponding language or dialect identifier, e.g., a vector, provided as input to the speech recognition model to specify the use of the language or dialect. The language or dialect vectors can be one-hot vectors. In some implementations, language or dialect identifiers, e.g., embedding vectors, are learned through training are used as weights to combine clusters.

The speech recognition model can be one that has been trained to output scores indicative of labels representing different languages or dialects, and the speech recognition model is configured to generate output sequences that include one of the labels representing the different languages or dialects. A label for the language or dialect can be included in an output sequences, e.g., after linguistic units of the output sequence.

The one or more computers receive output that the speech recognition model generated in response to receiving the input features determined based on the audio data (506). The output may include a set of scores, e.g., posterior probability scores, that each indicate a likelihood of a different linguistic unit. In some implementations, the linguistic units are graphemes. The speech recognition model can be configured to provide output indicating a probability distribution over a predetermined set of graphemes.

The one or more computers provide a transcription of the utterance generated based on the output of the speech recognition model (508). In some implementations, the transcription is determined without using a language model.

In some implementations, the speech recognition model includes an encoder, a decoder, and an attention model that learns alignments between outputs of the encoder and the decoder. The encoder, the decoder, and the attention model can each include one or more neural network layers that have parameters learned through training using the using training examples representing speech in different languages or dialects.

In some implementations, the speech recognition model has been trained using multi-task learning. Training can use (i) a first objective function corresponding to grapheme prediction, and (ii) a second objective function corresponding to a language or dialect classification cost. The first objective function and second objective function can be weighted so that the speech recognition model is trained to learn hidden representations that are effective for both language and dialect classification and grapheme prediction.

In some implementations, the process 500 includes determining a language or dialect of the utterance and providing, as input to the speech recognition model, data indicating the language or dialect as input to one or more neural network layers of the speech recognition model. The output of the speech recognition model can be generated based on input features determined from the audio data for the utterance and the data indicating the language or dialect of the utterance. To provide data indicating the language or dialect a 1-hot vector can be provided. The vector can have dimension of the number of languages or dialects in a predetermined set of languages or dialects. As a result, the vector can have a value corresponding to each of the of languages or dialects in a predetermined set of languages or dialects. For example, all values can be zero except for the value for one language or dialect that is indicated with a one. As another example, the data indicating the language or dialect can be an embedding corresponding to the language or dialect, where the embedding has been learned through training.

Data indicating the language or dialect corresponding to input speech features can be provided as input to one or more neural network layers of an encoder of the speech recognition model. In addition or as an alternative, data indicating the language or dialect can be provided as input to one or more neural network layers of the of the decoder. In some cases, the data indicating the language or dialect is provided as input to one or more neural network layers of the encoder and to one or more neural network layers of the decoder. In some cases, the data indicating the language or dialect is provided as input to each neural network layer of the encoder and to each neural network layer of the decoder. As an example, at each neural network layer of the encoder and the decoder, a vector indicative of the language or dialect can be linearly transformed by the weight matrices of the neural network layer and added to the original hidden activations before a nonlinearity is applied.

In some implementations, the speech recognition model comprises an encoder, a decoder, and an attention model that learns alignments between outputs of the encoder and the decoder. The encoder, the decoder, and the attention model can each comprise one or more neural network layers that have parameters learned through training using the using training examples representing speech in multiple languages or dialects. The speech recognition model can be one that has been trained using cluster adaptive training, with each language or dialect corresponding to a separate cluster. For each cluster, a single LSTM layer is used with output projection to match the dimension of a particular layer of the speech recognition model. A weighted sum of all the cluster adaptive trained bases using dialect vectors as interpolation weights is added back to the outputs of the particular layer to generate an aggregated output vector. The aggregated output vector is provided as input to last layer of the encoder of the speech recognition model.

In some implementations, the speech recognition model has been trained to output scores indicating likelihoods of graphemes in a set representing the union of language-specific grapheme sets for multiple languages. One or more of the language-specific grapheme sets include one or more graphemes not included in the language-specific grapheme set for another of the multiple languages. The speech recognition model has been trained based on training examples from each of the multiple languages. The speech recognition model can be arranged such that all of the model parameters contribute to accounting for variations between different languages. The speech recognition model can be trained using multitask training to predict a language identifier and graphemes corresponding to input data, where language identification annotations assigned as labels for training examples are used during training of the speech recognition model, but language identification data is not provided as an input during inference using the speech recognition model. During training, output of an encoder of the speech recognition model can be averaged across multiple frames to obtain an utterance-level feature vector, which is passed to a softmax layer to predict the likelihood of speech belonging to each of the multiple languages.

In some implementations, the speech recognition model may be explicitly conditioned on language identification input and may be configured to receive a language identifier as input during inference using the speech recognition model. The language identifier for each language can be a fixed-dimensional language embedding (e.g., the embeddings for each language have the same size) having values learned through training. The speech recognition model can be configured to receive a language embedding as input to a first layer of an encoder of the speech recognition model, as input to a first layer of a decoder of the speech recognition model, or as input to both a first layer of an encoder of the speech recognition model and a first layer of a decoder of the speech recognition model.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method of jointly performing speech recognition and language prediction using a sequence-to-sequence speech recognition model, the method when executed on data processing hardware causes the data processing hardware to perform operations comprising:
    receiving audio data characterizing a spoken utterance;
    processing, using the sequence-to-sequence speech recognition model, the audio data to generate, at each of a plurality of time steps:
        a probability distribution over a predetermined set of linguistic units; and
        a predicted language of the spoken utterance among multiple different languages the speech recognition model has been trained to recognize; and
    providing, as an output from the sequence-to-sequence speech recognition model, a transcription of the utterance based on the probability distribution over the predetermined set of linguistic units and the predicted language generated at each of the plurality of time steps,
        wherein the speech recognition model is trained using multi-task learning using:
            a first objective function corresponding to grapheme prediction; and
            a second objective function corresponding to a language or dialect classification cost, the first objective function and second objective function being weighted such that the speech recognition model is trained to learn hidden representations that are effective for both language and dialect classification and grapheme prediction.

2. The computer-implemented method of claim 1, wherein the sequence-to-sequence speech recognition model is trained using multi-task learning to teach the sequence-to-sequence speech recognition model to learn how to jointly predict linguistic units and language from input audio data.

3. The computer-implemented method of claim 1, wherein the sequence-to-sequence speech recognition model is trained using multi-task learning by:
    obtaining training data comprising:
        training audio data characterizing training utterances each spoken in one of a plurality of different languages; and
        for each training utterance, a corresponding target output label sequence corresponding to a transcription of the corresponding training utterance, wherein each target output label sequence is annotated with a special language symbol indicating the language of the corresponding training utterance; and
    training the sequence-to-sequence speech recognition model on the training data to learn how to jointly predict the target output label sequence and the special language symbol for each training utterance.

4. The computer-implemented method of claim 3, wherein training the speech recognition model on the training data causes the speech recognition model to:
    output scores indicative of special language symbols representing the multiple different languages of the utterances; and
    generate output sequences that include one of the special language symbols representing the multiple different languages.

5. The computer-implemented method of claim 1, wherein the sequence-to-sequence speech recognition model comprises an encoder and a decoder.

6. The computer-implemented method of claim 5, wherein the encoder comprises one or more neural network layers that have parameters learned through training using training examples representing speech in the multiple different languages.

7. The computer-implemented method of claim 5, wherein the decoder comprises one or more neural network layers that have parameters learned through training using training examples representing speech in the multiple different languages.

8. The computer-implemented method of claim 1, wherein the linguistic units are word pieces.

9. The computer-implemented method of claim 1, wherein the linguistic units are graphemes.

10. A system comprising:
    data processing hardware; and
    memory hardware in communication with the data processing hardware and storing instructions that when executed on the data processing hardware causes the data processing hardware to perform operations comprising:
        receiving audio data characterizing a spoken utterance;
        processing, using the sequence-to-sequence speech recognition model, the audio data to generate, at each of a plurality of time steps:
            a probability distribution over a predetermined set of linguistic units; and
            a predicted language of the spoken utterance among multiple different languages the speech recognition model has been trained to recognize; and
        providing, as an output from the sequence-to-sequence speech recognition model, a transcription of the utterance based on the probability distribution over the predetermined set of linguistic units and the predicted language generated at each of the plurality of time steps,
            wherein the speech recognition model is trained using multi-task learning using:

a first objective function corresponding to grapheme prediction; and a second objective function corresponding to a language or dialect classification cost, the first objective function and second objective function being weighted such that the speech recognition model is trained to learn hidden representations that are effective for both language and dialect classification and grapheme prediction.

11. The system of claim 10, wherein the sequence-to-sequence speech recognition model is trained using multi-task learning to teach the sequence-to-sequence speech recognition model to learn how to jointly predict linguistic units and language from input audio data.

12. The system of claim 10, wherein the sequence-to-sequence speech recognition model is trained using multi-task learning by:

obtaining training data comprising:

training audio data characterizing training utterances each spoken in one of a plurality of different languages; and for each training utterance, a corresponding target output label sequence corresponding to a transcription of the corresponding training utterance, wherein each target output label sequence is annotated with a special language symbol indicating the language of the corresponding training utterance; and training the sequence-to-sequence speech recognition model on the training data to learn how to jointly predict the target output label sequence and the special language symbol for each training utterance.

13. The system of claim 12, wherein training the speech recognition model on the training data causes the speech recognition model to:

output scores indicative of special language symbols representing the multiple different languages of the utterances; and generate output sequences that include one of the special language symbols representing the multiple different languages.

14. The system of claim 10, wherein the sequence-to-sequence speech recognition model comprises an encoder and a decoder.

15. The system of claim 14, wherein the encoder comprises one or more neural network layers that have parameters learned through training using training examples representing speech in the multiple different languages.

16. The system of claim 14, wherein the decoder comprises one or more neural network layers that have parameters learned through training using training examples representing speech in the multiple different languages.

17. The system of claim 10, wherein the linguistic units are word pieces.

18. The system of claim 10, wherein the linguistic units are graphemes.

* * * * *